Dec. 10, 1968  K. NITTKA  3,415,134

STEPLESS TORQUE CONVERTER

Filed May 17, 1967  2 Sheets-Sheet 1

Karl Nittka
INVENTOR.

BY Karl G. Ross
Attorney

Dec. 10, 1968  K. NITTKA  3,415,134
STEPLESS TORQUE CONVERTER
Filed May 17, 1967  2 Sheets-Sheet 2
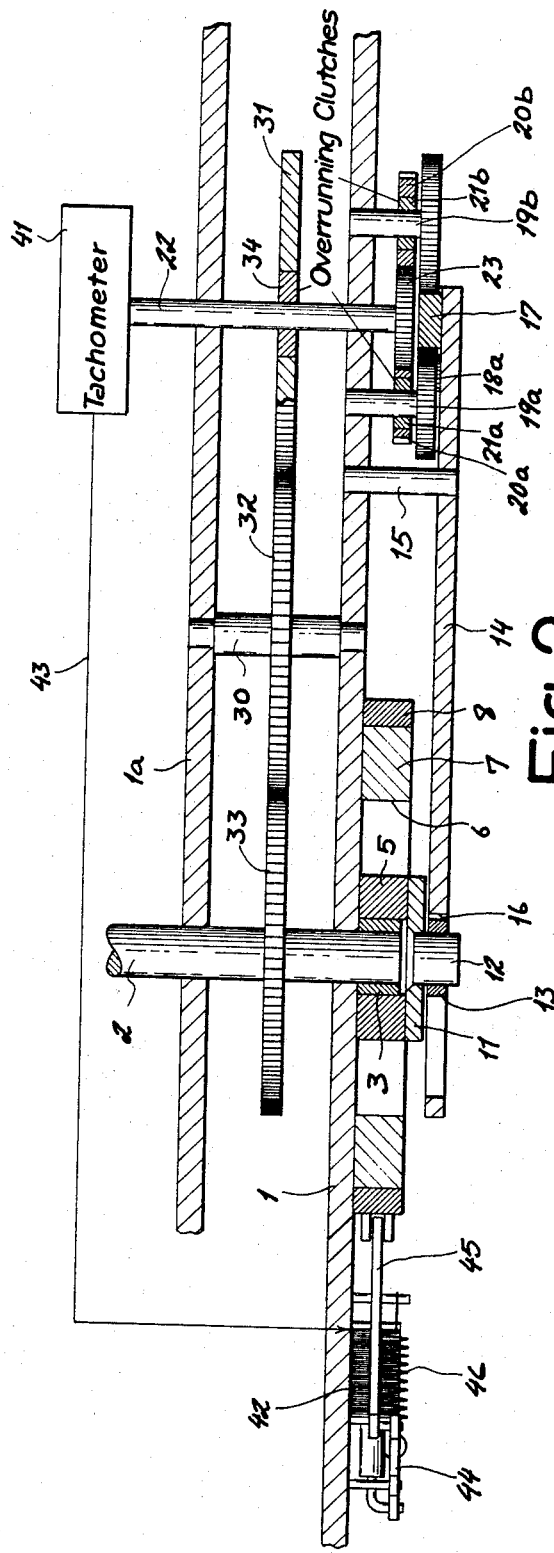
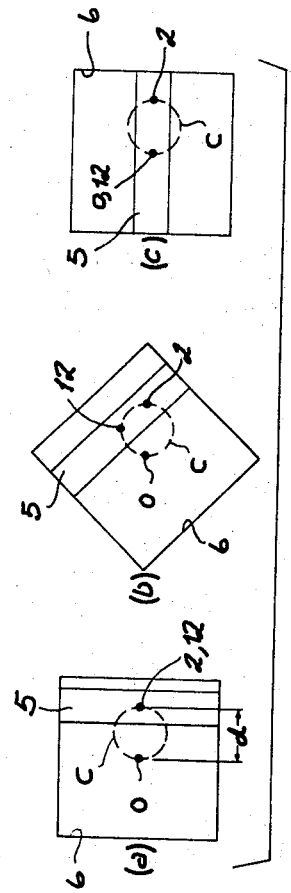
Karl Nittka
INVENTOR.
BY Karl F. Ross
Attorney

United States Patent Office 3,415,134
Patented Dec. 10, 1968

3,415,134
STEPLESS TORQUE CONVERTER
Karl Nittka, 6002 Uhlandstr. 7, Wiesbaden, Germany
Filed May 17, 1967, Ser. No. 639,208
11 Claims. (Cl. 74—117)

ABSTRACT OF THE DISCLOSURE

Torque converter of the general type disclosed in U.S. Patent No. 3,321,984 wherein a longitudinally slotted slide is mounted for transverse displacement in a rectangular cutout of a disk whose center is adjustably offset from a stationary fulcrum about which the slide is rotatable by means of an input shaft centered on that fulcrum; this input shaft terminates in a key received in the slot of the slide whereby every shaft revolution causes a longitudinal reciprocation of the key in its slot and a transverse reciprocation of the slide in its cutout. As a result of this composite motion, the midpoint of the slide describes a circular path whose diameter equals the offset between the disk center and the slide fulcrum; this midpoint is coupled with a swingable arm whose oscillations about a fixed pivot are translated by means of overrunning clutches into a unidirectional rotation of an output shaft which in turn may be connected with the input shaft through a one-way gear train preventing the output shaft from outrunning the input shaft.

---

My present invention relates to improvements in a transmission system of the general type described in my copending application Ser. No. 392,137, filed August 26, 1964, now Patent No. 3,321,984, which can be used as an adjustable torque converter in transmitting a torque from a drive or input shaft to a driven or output shaft.

The system particularly described and claimed in my prior patent comprises a disk formed with a pair of parallel tracks, such as opposite sides of a rectangular cutout, wherein a longitudinally slotted slide is mounted for transverse displacement. The slide is rotatable about a stationary fulcrum which is offset from the center of the disk and which may be the axis of an input shaft rigid with a rectangular key slidably received in its slot. It is, however, also possible to rotate the disk while coupling the slide with the output shaft. In either case, the slide reciprocates along its tracks in the course of a disk revolution and concurrently shifts with reference to its fulcrum in the longitudinal direction of its slot; this longitudinal reciprocation is utilized in my prior system to generate a unidirectional rotation of the output shaft with the aid of interposed overrunning clutches.

An important object of my present invention is to provide an alternate solution to the problem of converting the motion of the slide, whose stroke depends on the offset between its own fulcrum and the disk center, into a rotation of the output shaft, with simplification of the linkage required to transmit that motion to the drive shaft.

Another object of this invention is to provide means for stabilizing, in such transmission system, the speed of the output shaft in the face of variations in the speed of the input shaft.

A further object of my invention is to provide means in such system for absorbing the unbalanced forces due to eccentric reciprocation of the slide on its carrier disk.

As explained in my earlier patent, the midpoint of the slide traces, in the course of a disk revolution, a circular path whose diameter equals the spacing between the disk center and the slide fulcrum. According to a feature of my present improvement, it is this circular motion, rather than the linear displacement of the slide relative to its fulcrum, which is converted into a torque of the output shaft, the means for effecting this conversion including a swingable arm linked to the midpoint of the slide. More particularly, the opposite end of the arm may be formed with a curved rack, centered on a fixed pivot about which the arm is swingable, in mesh with a pinion driving the output shaft through an overrunning clutch; preferably a second rack also centered on the pivot, but with its teeth facing in the opposite direction, engages another pinion coupled with an inversely oriented overrunning clutch so that either one or the other clutch transmits torque to the output shaft during each swing of the arm.

Pursuant to another feature of my present invention, I provide automatic means for changing the offset between the disk center and the slide fulcrum in response to variations in the speed of the output shaft, e.g. as detected by a tachometer driven by that shaft, to tend to keep the speed of the output shaft substantially constant by compensating for variations in input-shaft speed through changes in the swing of the coupling arm.

Still another feature of my invention involves the provision of a pair of balancing levers, preferably T-shaped, which are pivoted at symmetric locations on the disk and which are positively coupled with the slide and weighted to absorb the momentum of its eccentric reciprocation.

In many instances, e.g. in the case of a vehicular drive, it is desirable to prevent the output shaft and its load from outrunning the input shaft whose speed is under the direct control of the operator. For this purpose, I may provide, in accordance with yet another feature of my instant invention, a one-way gear train so interconnecting the two shafts that the speed of the output shaft cannot exceed a maximum value bearing a predetermined relationship to the speed of the input shaft; if the gear train has a transmission ratio of 1:1, the maximum output speed will be identical with the input speed. This feature also allows for reverse rotation of the output shaft upon reversal of the input-shaft drive.

The above and other features of my invention will become more fully apparent with reference to the accompanying drawing in which:

FIG. 2 is a sectional view taken on the line II—II of FIG. 1; and

FIG. 3 is an explanatory diagram similar to FIG. 12 of my prior patent.

Figure 1:
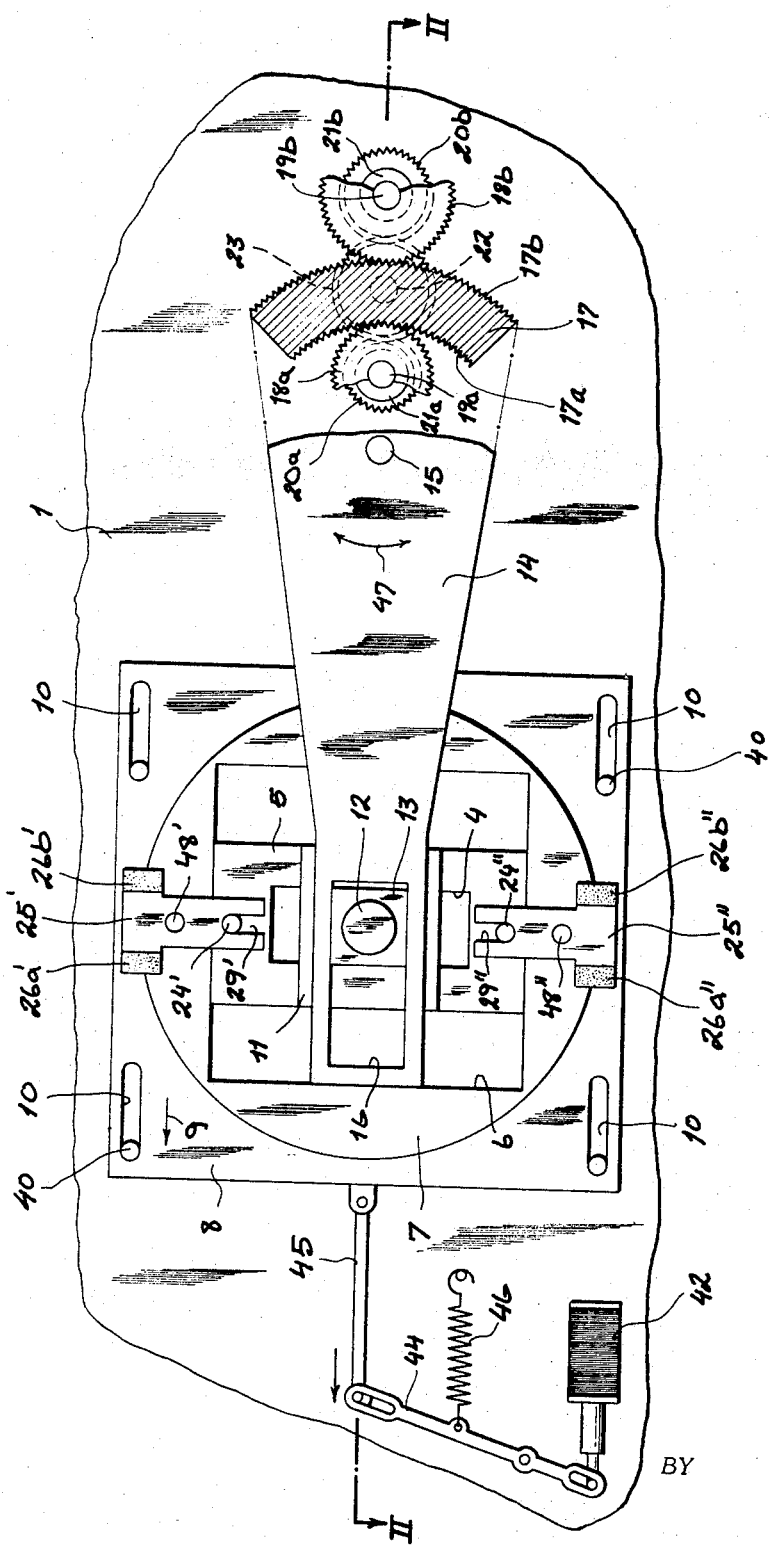
FIG. 1 is a somewhat diagrammatic elevational view of a torque converter embodying the present inmprovement.

As shown in FIGS. 1 and 2, a pair of parallel walls 1, 1a, forming part of the machine housing, have journaled therein an input shaft 2 and an output shaft 22. Shaft 2, powered by a motor not shown, is rigid with a key 3 of square configuration playing in a longitudinal slot 4 of a slide 5; the latter, in its turn, is transversely displaceable in a cutout 6 of a disk 7, the upper and lower edges of this cutout (as viewed in FIG. 1) thus forming a pair of tracks for the guidance of the slide. Disk 7 is rotatably mounted in a supporting plate 8 formed with a corresponding circular opening; the disk has a set of slots 10, parallel to the direction of motion of slide 5, which are traversed by pins 40 so that the disk can be shifted along these slots as indicated by arrow 9. Such a shift, designed to vary the speed ratio between shafts 2 and 22, can be brought about manually or, advantageously, automatically with the aid of a control mechanism responsive to the speed of output shaft 22. As particularly illustrated, this mechanism comprises a tachometer 41 driven by shaft 22, a solenoid 42 controlled by the tachometer via a circuit diagrammatically indicated at 43, and a lever 44 which engages a link 45 attached to support 8. It is assumed that the voltage output of tachometer 41 is a maximum at standstill and decreases with increasing shaft speed, energization of the solenoid causing a clockwise swing of lever 44 against the force of a restoring spring 46 with consequent leftward displacement of disk 7.

A bridge piece 11 spans the slot 4 of slide 5 and carries a stud 12 aligned with the midpoint of the slide. Swivelably mounted on stud 12 is a square key 13 slidably received in a slot 16 of an arm 14 which is swingable about a fixed pivot 15 on wall 1. The opposite end of arm 14, closer to pivot 15, bears a curved rib 17 with an inner and an outer set of rack teeth 17a, 17b centered on pivot 15. Teeth 17a mesh with a pinion 18a on a shaft 19a also bearing a pinion 20a in engagement with a gear 23 which is rigid with outer shaft 22; similarly, rack teeth 17b mesh with a pinion 18a on a shaft 19b which also carries a pinion 20b engaging the same gear 23. Overrunning clutches 21a and 21b oppositely oriented, are inserted between shafts 19a, 19b and pinions 20a, 20b, respectively.

Output shaft 22 also drives, through another overrunning clutch 34, or equivalent one-way coupling, a gear 31 in mesh with a second gear 32 on a stud shaft 30, gear 32 engaging a gear 33 which is keyed onto input shaft 2. As here shown, all the gears of train 31–33 have the same number of teeth so that clutch 34 will establish a positive connection between this gear train and output shaft 22 as soon as the speed of the latter reaches that of shaft 2. This positive connection will also come into play upon a reversal of input shaft 2 which, in view of the invariable orientation of overrunning clutches 21a and 21b, would not otherwise cause any reversal of the rotation of output shaft 22.

Although disc support 8 has been illustrated in a position in which the center of disk 7 coincides with the fulcrum of slide 5 represented by key 3, the system will normally be displaced from this aligned position by the energization of solenoid 42. In the aligned position, head 13 rotates ineffectually about the axis of shaft 2 and no torque is transmitted to output shaft 22 provided that shaft 2 is driven in its forward direction in which clutch 34 is free-wheeling.

Reference will now be made to FIG. 3 for an explanation of the principle of operation of my improved system. In each of the three views (a), (b), (c) of this FIGURE I have shown at O the center of disk 7 (and therefore of cutout 6) which is fixed for any given position of support 8; the location of stud 12 at the midpoint of slide 5; and the position of the axis of shaft 2, representing the fulcrum of the slide which is also fixed in space. It will be seen that the slide midpoint 12 coincides with its fulcrum 2 in the starting position (a) which corresponds to the position shown in FIGS. 1 and 2 upon a leftward shift of disk support 8 to offset the disk center O from the slide fulcrum 2 by a distance d. This distance d represents the diameter of circle C traced by the midpoint 12 of the slide when the disk is rotated about its center. Thus, midpoint 12 moves through a quadrant of that circle upon rotation of the disk by 45° (position b) and thereafter coincides with point O when the disk has been turned through 90° (position c), the revolution of the midpoint therefore being twice as fast as that of the disk. The same circular motion is, of course, performed by the head 13 and results in an oscillation of arm 14 about stud 12 as indicated by arrow 47 (FIG. 1). This oscillation, in turn, drives the output shaft 22 alternately through overrunning clutches 21a and 22b. To smooth the rotation of that shaft, a flywheel may be mounted thereon as shown in my prior patent.

Means have also been provided in my system for counteracting the unbalancing effect of the eccentric reciprocation of slide 5 on disk 7. To this end I provide a pair of pins 24', 24" on opposite ends of slide 5, each of these pins being straddled by a bifurcate end 29', 29" of a T-shaped member 25', 25" which is rotatable about a respective pivot 48', 48" located on a common diameter (here vertical) of the disk. Each end of the cross-bar of the T is provided with a respective weight 26a, 26b' and 26b", these symmetrically disposed weights absorbing the momentum of slide 5 during reciprocation of the latter.

Naturally, the balancing means 25', 25" could also be used in combination with transmission systems other than the one specifically disclosed herein, such as those shown in my prior patent; the same applies to such other features as the one-way gear train 31–34 and the automatic disk control 41–46.

I claim:
1. A transmitting system for transmitting torque from an input shaft to an output shaft, comprising a rotatable disk provided with a pair of parallel tracks bounding a rectangular area substantially centered thereon; a slide received between said tracks for reciprocation therealong, said slide having a slot at right angles to said tracks; a key rigid with said input shaft slidably received in said slot, said key defining a stationary fulcrum for said slide offset from the center of said disk whereby a rotation of said input shaft is translated into a rotation of said disk about its center with concurrent reciprocation of said key in said slot and of said slide along said tracks and with the midpoint of said slide describing a circle whose diameter corresponds to the offset between said fulcrum and said center; adjustment means for varying said offset; a swingable arm linked with said slide at said midpoint; and coupling means between said arm and said output shaft for translating oscillations of said arm into a rotation of said output shaft.

2. A system as defined in claim 1 wherein said arm is provided with a fixed pivot remote from said midpoint, said coupling means including curved rack means centered on said pivot.

3. A system as defined in claim 2 wherein said rack means comprises a first rack with teeth confronting said pivot and a second rack with teeth facing away from said pivot, said coupling means further including a pair of pinions respectively engaging said racks, a pair of inversely oriented overrunning clutches respectively connected with said pinions, and gear means driven by said clutches for unidirectionally rotating said output shaft.

4. A system as defined in claim 1 wherein said arm has an elongated cutout, said slide being provided at its midpoint with a rectangular swivel head slidably received in said cutout.

5. A system as defined in claim 1, further comprising weighted balancing means on said disk yieldably engaging said slide for absorbing the momentum of reciprocation thereof along said tracks.

6. A system as defined in claim 5 wherein said balancing means comprises a pair of generally U-shaped members pivoted onto said disk on a common diameter transverse to said tracks, the cross-bar of the T being provided with weights at its ends, the shank of the T being in positive contact with said slide.

7. A system as defined in claim 1, further comprising one-way torque-transmitting means connected between said input and output shafts for limiting the speed of said output shaft to a maximum bearing a predetermined relationship with the speed of said input shaft.

8. A system as defined in claim 1 wherein said disk is provided with a displaceable support, said adjustment means being coupled to said output shaft and connected with said support for displacing the latter in response to the speed of said output shaft and in a sense tending to keep said speed substantially constant.

9. A transmission system for transmitting torque from an input shaft to an output shaft, comprising a rotatable disk member provided with a pair of parallel tracks bounding a rectangular area substantially centered thereon; a slide member reciprocable along said tracks and provided with pivot means enabling its rotation about a stationary fulcrum offset from the center of said disk member, said slide member having a slot accommodating said pivot means and extending at right angles to said tracks; first coupling means between said input shaft and one of said members for rotating same, thereby causing reciprocation of said slide member along said tracks to an extent determined by the offset of said fulcrum from said center; second coupling means between said slide member and said output shaft for converting said reciprocation into rotation of said output shaft; and adjustment means responsive to the speed of said output shaft for varying said offset in a sense tending to keep said speed substantially constant.

10. A transmission system for transmitting torque from an input shaft to an output shaft, comprising a rotatable disk member provided with a pair of parallel tracks bounding a rectangular area substantially centered thereon; a slide member reciprocable along said tracks and provided with pivot means enabling its rotation about a stationary fulcrum offset from the center of said disk member, said slide member having a slot accommodating said pivot means and extending at right angles to said tracks; first coupling means between said input shaft and one of said members for rotating same, thereby causing reciprocation of said slide member along said tracks to an extent determined by the offset of said fulcrum from said center; second coupling means between said slide member and said output shaft for converting said reciprocation into rotation of said output shaft; and weighted balancing means symmetrically mounted on said disk member in yieldable engagement with said slide member for absorbing the momentum due to reciprocation thereof along said tracks.

11. A transmission system for transmitting torque from an input shaft to an output shaft, comprising a rotatable disk member provided with a pair of parallel tracks bounding a rectangular area substantially centered thereon; a slide member reciprocable along said tracks and provided with pivot means enabling its rotation about a stationary fulcrum offset from the center of said disk member, said slide member having a slot accommodating said pivot means and extending at right angles to said tracks; first coupling between said input shaft and one of said members for rotating same, thereby causing reciprocation of said slide member along said tracks to an extent determined by the offset of said fulcrum from said center; second coupling means between said slide member and said output shaft for converting said reciprocation into rotation of said output shaft; and one-way torque-transmitting means connected between said input and output shafts for limiting the speed of said output shaft to a maximum bearing a predetermined relationship with the speed of said input shaft.

References Cited

UNITED STATES PATENTS

| | | | |
|---|---|---|---|
| 668,958 | 2/1901 | Hallett | 74—30 |
| 2,384,110 | 9/1945 | Malmquist | 74—116 |
| 2,932,255 | 4/1960 | Neukirch | 74—117 |
| 804,828 | 11/1905 | Crist | 74—121 |

FOREIGN PATENTS 412,029  9/1945  Italy.

FRED C. MATTERN, Jr., *Primary Examiner.*

WESLEY S. RATLIFF, *Assistant Examiner.*

U.S. Cl. X.R.

74—30